July 28, 1925.
J. E. D. ISAKSON
1,548,005
PISTON
Filed Feb. 6, 1923
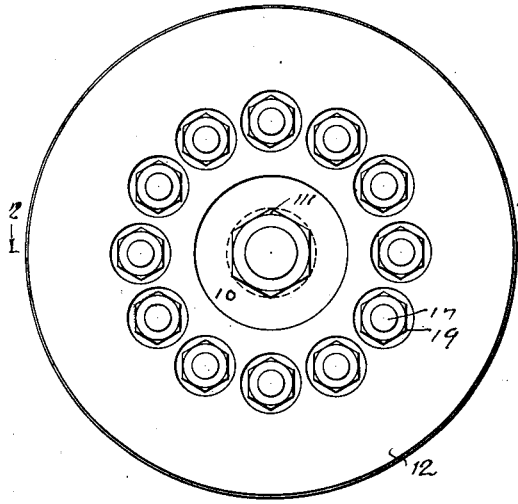
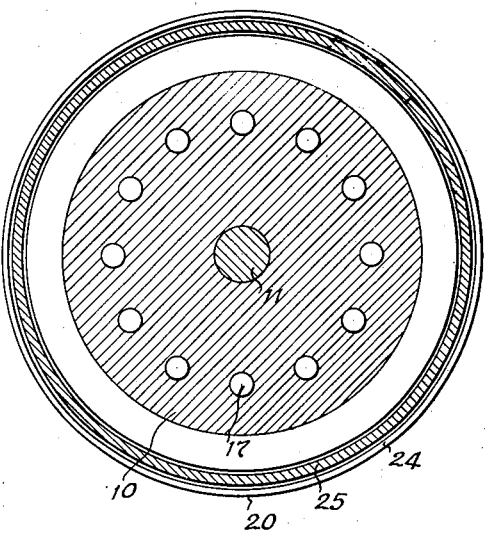
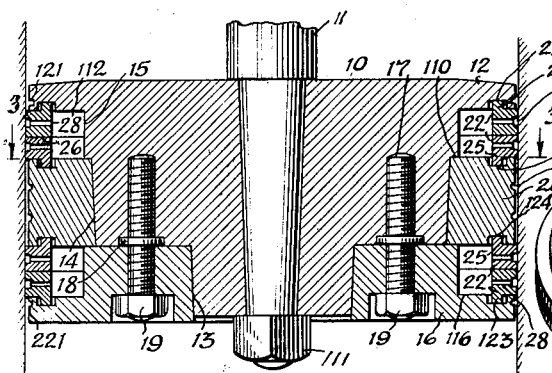
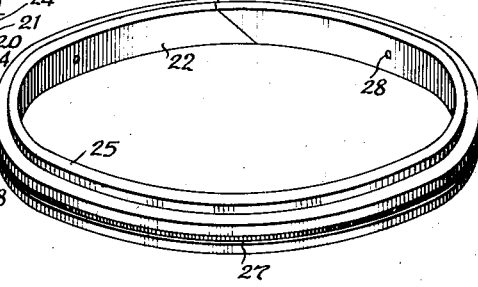
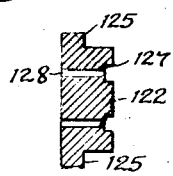
WITNESSES
INVENTOR
JOHN E.D. ISAKSON
ATTORNEYS Patented July 28, 1925.

1,548,005

UNITED STATES PATENT OFFICE.

JOHN E. D. ISAKSON, OF BROOKLYN, NEW YORK.

PISTON.

Application filed February 6, 1923. Serial No. 617,379.

*To all whom it may concern:*

Be it known that I, JOHN E. D. ISAKSON, a citizen of the United States of America, and a resident of the city of New York, borough of Brooklyn, in the county of Kings and State of New York, have invented a new and Improved Piston, of which the following is a description.

My invention relates to a piston and while adapted for use generally where pistons are employed, is more particularly intended for embodiment in an engine piston.

The general object of my invention is to provide a piston embodying an assemblage making for the prevention of cutting of the cylinder by the piston as well as to provide a construction by which leakage past the piston is minimized and whereby the piston and cylinder in which it operates may be used for a long period without repairs.

The nature of the invention and its distinguishing features and characteristics will clearly appear as the description proceeds.

Reference is to be had to the accompanying drawings forming a part of this specification, it being understood that the drawings are merely illustrated of one example of the invention.

Figure 1 is an end view of a piston embodying my invention;

Figure 2 is a longitudinal section through the piston as indicated by the line 2—2, Figure 1;

Figure 3 is a transverse section as indicated by the line 3—3, Figure 2;

Figure 4 is a perspective view of one of the piston ring elements;

Figure 5 is a cross section through a piston ring of modified form.

In carrying out my invention in accordance with the illustrated example the piston body or head 10 is secured as usual to the piston rod 11 by a nut 111 or equivalent means. The piston head 10 is formed with an annular flange 12 at the back and forward of the front flange 12 said piston head is formed of zones of varying diameter, there being a small zone 13 adjacent the front face of the head 10, and intermediate tapered zone 14, larger than the zone 13, and a third still larger zone 15 adjacent to the flange 12. The piston follower 16 has a tapered fit on the zone 13 and it may be secured in position by studs or bolts, there being shown in the present example studs 17 having intermediate the ends thereof a fixed collar 18 countersunk in the head 10 to lie flush with that face contacting with the follower 16 and to be overlapped by the latter. The nuts 19 of the studs 17 are countersunk in the follower 16.

On the piston head 10 at the intermediate tapered zone 14 is fitted a ring 20, the fit of said ring being sufficiently tight for the ring (20) to be one with the head 10 in the movements of the latter. In the co-terminus plane of the zones 14, 15 of the piston head 10 a shoulder 110 is formed against which the ring 20 bears at the rear surface of said ring when fitted to the tapered zone 14, the opposite or front face of the ring 20 lying in the same plane as that front surface of the piston head 10 between the zones 13 and 14. The follower 16 overlaps the front face of the ring 20 so that the said ring is immovably held when said follower is secured by the studs 17 or equivalent means. At the periphery the ring 20 is formed with annular grooves 21 to hold a limited quantity of water of condensation. In flange 12 of head 10, at the periphery is an annular water groove 121 and a similar peripheral groove 221 is formed in follower 16.

With the ring 20 and the follower 16 in place said ring and follower and the piston head 10 will be in fixed relation to one another. The follower 16 at the inner face has a peripheral annular recess 116, said recess at the rear side being walled by the front face of the ring 20. The space or recess 116 between the follower 16 and the ring 20 accommodates a floating piston ring or a pair of floating piston rings 22 and similarly in the space between the rear face of the ring 20 and the front face of peripheral flange 12 of piston head 10 is a space 112. Between the ring 20 and flange 12 in space 112, a second pair of floating piston rings 22 (or a single ring 122) is emplaced. In the front face of the flange 12 and in the rear face of the ring 20 are annular grooves designated respectively 23 and 24. On the rings 22 are annular tongues or beads 25 entering said grooves 23, 24. The grooves 23, 24 have a greater width, that is to say, a greater dimension radial of the piston than the tongues or beads 25, whereby said tongues or beads may have radial play in the expansion of the rings 22 but the engagement of the tongues 25 in the grooves prevents complete radial displacement of the rings should the said rings become broken. In the front face of the fixed ring 20 and in the rear face of the follower 16 are respectively annular grooves 124 and 123, corresponding with the grooves 24 and 23 and in said annular grooves 123, 124 are received the annular tongue or beads 25 on the rearward pair of piston rings 22. It will be understood that one pair of piston rings 22 may be omitted but advantageously both front and rear rings are employed in practice.

In Figure 5 is shown a single piston ring 122 corresponding with a pair of piston rings 22, said ring 122 having the annular beads 125 at the front and rear faces corresponding with the tongues or beads 25. In the rings 22 are formed peripheral annular steam grooves 27, communicating with which are radial steam passages 28. The fit of the rings 22 or the ring 122 is such as to permit steam to pass to the back of the rings at the front and rear faces of the rings and between the pairs of rings 22. It will be understood that each ring 22 or the ring 122 is a floating ring capable of turning movement on the piston about the axis of the piston head and capable of radial expansion and contraction. The steam grooves 27 and passages 28 provide for almost a complete balance of the pressure at the peripheral faces of the floating rings and at the backs thereof. For example, if the steam pressure under which the piston is operating is 200 lbs. there will be 180 lbs. pressure, approximately, at the periphery of rings 22, or 122, but 200 lbs. pressure at the back of the rings, thereby making for net outward pressure of 20 lbs. on the rings, a pressure which maintains the piston sufficiently steam tight to prevent leakage past the piston but not severe enough to cut the cylinder particularly in view of the floating character of the piston ring. The numeral 127 represents a peripheral steam groove in the ring 122 and 128 the radial steam passages, said grooves and passages corresponding with the grooves and passages 27 and 28.

It is to be noted that in the described construction the ring 20 and not the head 10 takes the wear of the piston at the periphery and therefore in addition to the life of the piston being prolonged by the floating piston ring assemblage as described, the taking of the wear by the removable ring 20 indefinitely prolongs the life of the piston head because said ring 20 alone needs to be renewed upon excessive wear and the renewal of the head or the discarding of the whole piston is thereby obviated.

Practical tests having demonstrated that a piston constructed as described may be used for long periods without requiring repair or adjustment, a piston embodying the invention having been used on a marine engine for nearly 100,000 nautical miles without needing repair of the piston or of the cylinder in which it operated.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A piston embodying a head having zones of varying diameters including an intermediate tapered zone, a ring fitting said tapered zone to be rigid with the head, a follower in the rear of said ring, the follower and the head having peripheral portions spaced from the adjacent faces of said ring, and piston rings floatingly retained in said spaces between the first-mentioned ring and the head and follower, said floating rings and the walls of said spaces having interengagement, said floating rings being free to have turning movement on the piston about the axis thereof and having play radially in said spaces in the expansion and contraction of said floating rings, the interengagement between the floating rings and the walls of said spaces preventing complete displacement of the floating rings in the event of breakage thereof.

2. A piston including a head having a tapered zone, a ring having a tapered fit on said head at zone to partake of the movements of the head, said piston presenting annular spaces in the front and rear of said ring, the side walls of said spaces having annular grooves, and floating piston rings having members fitting in said grooves and free to play radially therein as well as to have turning movement on the piston about the axis thereof, the engagement of said members of the floating rings in said grooves preventing complete displacement of the floating rings should breakage occur.

JOHN E. D. ISAKSON.